US 6,682,651 B1

(12) United States Patent
Toland et al.

(10) Patent No.: US 6,682,651 B1
(45) Date of Patent: Jan. 27, 2004

(54) BARREL TYPE FISH AND/OR PARTICULATE SCREEN DEVICE

(76) Inventors: Blake Andrew Toland, 755 Woodwind Pl., Walnut Creek, CA (US) 94598; John L. Winther, 12 El Sereno, Orinda, CA (US) 94563

( * ) Notice: Subject to any disclaimer, the term of this patent is extended or adjusted under 35 U.S.C. 154(b) by 144 days.

(21) Appl. No.: 10/072,848

(22) Filed: Feb. 6, 2002

Related U.S. Application Data

(60) Provisional application No. 60/276,432, filed on Mar. 6, 2001.

(51) Int. Cl.[7] ............................................. B01D 29/33
(52) U.S. Cl. ...................... 210/155; 210/162; 210/170; 210/338; 210/461; 405/81; 405/127
(58) Field of Search ................. 210/155, 162, 210/170, 337, 338, 459, 460, 461, 485, 489, 498, 499; 405/81, 127

(56) References Cited

U.S. PATENT DOCUMENTS

| 705,364 | A | * | 7/1902 | Kurtz ........................ 210/170 |
| 1,274,121 | A | * | 7/1918 | White ........................ 210/162 |
| 1,315,615 | A | * | 9/1919 | Wahlman .................... 405/127 |
| 1,451,394 | A | * | 4/1923 | Hurst ........................ 210/162 |
| 2,249,020 | A | * | 7/1941 | McFarlin .................... 210/460 |
| 2,683,969 | A | | 7/1954 | Mugnier |
| 3,996,138 | A | * | 12/1976 | Daidola et al. ............... 405/81 |
| 4,437,431 | A | | 3/1984 | Koch |
| 5,102,537 | A | * | 4/1992 | Jones ........................ 210/162 |
| 5,161,913 | A | | 11/1992 | Boylan |
| 5,581,934 | A | * | 12/1996 | Arnold, Sr. .................. 210/162 |
| 5,650,073 | A | * | 7/1997 | Merrett ....................... 210/170 |
| 6,036,850 | A | * | 3/2000 | Reynolds .................... 210/338 |
| 6,051,131 | A | | 4/2000 | Maxson |

FOREIGN PATENT DOCUMENTS

| SU | 853003 | 4/1979 |
| SU | 1138453 | 9/1983 |
| SU | 1298298 | 2/1985 |
| SU | 1654440 | 5/1989 |
| SU | 1740538 | 10/1990 |

* cited by examiner

Primary Examiner—Christopher Upton
(74) Attorney, Agent, or Firm—William Michael Hynes; Townsend and Townsend and Crew LLP

(57) ABSTRACT

A barrel type fish and/or particulate screen includes mesh stretched over a supporting cylindrical shell having closed ends. The closed interior opens to a fluid withdrawal conduit, which is connected to an outlet. An inner, substantially conical withdrawal manifold is provided with the base of the substantially conical withdrawal manifold connected to the withdrawal conduit and the manifold extending substantially the axial length of the cylindrical mesh. The substantially conical withdrawal manifold defines uniformly sized and arrayed flow apertures. These flow apertures have the same unit area per unit length of the substantially conical withdrawal conduit. This same unit area per unit length produces within the withdrawal manifold, a substantially constant velocity at all cross-sections of the manifold taken normal the flow along the major axis of the substantially conical shape. Flow velocity distribution through the metal mesh is maintained uniform at all rates of flow through the device.

10 Claims, 4 Drawing Sheets

BARREL TYPE FISH AND/OR PARTICULATE SCREEN DEVICE

CROSS-REFERENCES TO RELATED APPLICATIONS

This application claims priority from Provisional Patent Application No. 60/276,432, filed Mar. 6, 2001 by the named inventors herein entitled Barrel Type Fish and/or Particulate Screen Device, is likewise incorporated by reference as if fully set forth herein.

This invention relates to a fish and/or particulate screen and more particularly to a so-called "barrel type" fish and/or particulate screen. Specifically, a barrel type fish and/or particulate screen is disclosed having constant water approach velocity at substantially all mesh points on the barrel screen despite wide variations in flow volume through the fish and/or particulate screen.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

A critical feature of a fish and/or particulate screen is the water approach velocity. The lower the water approach velocity, the more fish and/or particulate-friendly the screens become, but also the more costly they become because of sheer size.

The barrel type fish screen is a known fish screen device. In the typical barrel type screen, a cylindrically arrayed mesh, usually a metallic screen having a minimum mesh size, is used to protect juvenile fish by preventing fish passage through the mesh of the screen.

Barrel type fish screens include cylindrically arrayed mesh defining an enclosed interior. The mesh confines the fish and/or particulate matter to the exterior of the cylinder. Water is withdrawn from the enclosed interior of the mesh at one of the circular ends of the cylindrically arrayed mesh.

The reader will understand that the mesh utilized with such screens—including the screen disclosed herein—can vary. We prefer perforated plate arrayed over a cylindrical body in the form of a stressed skin. Additionally, mesh can be defined by woven wire such as a wire screen. Alternately, so-called "wedge wire" can be used. This wedge wire defines smaller exterior openings expanding to larger interior openings. Such wedge wire has the property that lodging of particles within the mesh is inhibited. Mesh can also be made from a fabric arrayed about a cylindrical body. In the following specification, we use the term "mesh" to include these and other equivalent options.

Unfortunately, withdrawal of water at a chosen flow rate from one end of the cylindrically arrayed mesh results in non-uniform velocity (or velocity head) through the mesh. In the usual case, the non-uniform velocity is small away from the point of water withdrawal and high adjacent the point of water withdrawal from the closed interior of the cylindrical mesh.

Withdrawal of water at a different flow rate from one end of the cylindrically arrayed mesh results in a different non-uniform velocity (or velocity head) through the mesh. As the flow rather changes, it will be expected that the non-uniformity of the velocity (or velocity head) will likewise change. Thus, conventional barrel type fish and/or particle screens are subjected to non-uniformity of flow rate through the screens, this non-uniformity of flow rate being generally aggravated as overall flow rate changes through the screen.

Complicating these issues of non-uniform velocity through the mesh for a single flow rate and changing non-uniformity velocity through the mesh for different flow rates is the requirement that mesh must be sized for different fish species and have a minimum flow rate for different fish species. For example, there are times in the Central Valley estuary of California when delta smelt are in the water require a maximum approach velocity of 0.2 feet per second is advisable through mesh defining maximum openings of $3/32$nds of an inch. When only salmonids are present, it is possible that the permitting agencies will allow an approach velocity of 0.33 feet per second through mesh of the same size. If cleaning procedures for the cylindrical mesh are intermittent in nature, an approach velocity may be required as low 0.0825 feet per second. This low velocity is required because of the accumulation of particulate in the defined apertures within the mesh.

If the mesh is intended to preclude or reduce the passage of particulate, non-uniform velocity distribution through the mesh can result in progressive clogging. Initially, the mesh will become partially obstructed. Flow will stop at one portion of the mesh; flow velocity will increase at the remaining unblocked mesh. Thus the presence of clogging particulate in the water can progressively clog the mesh, starting at "hot spots" with mesh apertures of initial high velocity (or velocity head). As a rough approximation, such clogging seems to vary with the square of the flow velocity flowing through the mesh being clogged.

Additionally, when a fish screen is operating to protect fish from being transported with water from one water body to another (such as a pump or siphon), the flow rate across the fish screen between the supplying and receiving waters must frequently vary. These variations can occur with pump intake velocity change, tidally and/or with river stage variation. For example, where such a barrel type fish screen is used on a siphon between an elevated river and a lower receiving reservoir, the flow rate across the fish screen will vary as the reservoir fills. Even with the use of flow modulating valves and pumps, variable flow rates complicate the water approach velocity issue. In all fish screens of which we are aware, flow volume variations occurring along the designed screens result in non-uniform flow flow if rates through the screens.

U.S. Pat. No. 6,051,131 issued to Maxson Apr. 18, 2000, discloses a cylindrical intake screen to prevent damage to fish and other aquatic organisms by providing a controlled velocity profile at a particular flow rate. By extending two or more concentric tubular flow modifiers into one end of the screen, it is possible to achieve flow uniformity of more than 90% at a chosen flow rate.

This device does not consider wide variations of flow rates due to changing velocity head and flow volume requirements.

In the following, the fish screen will be illustrated with respect to a siphon. It will be understood that use with various valving schemes and pumps are contemplated. Additionally, this screen can be used with particulate matter as well.

SUMMARY OF THE INVENTION

A barrel type fish and/or particulate screen includes mesh over a supporting cylindrical framework. The cylindrical mesh is closed at both ends and defines an interior that can only be accessed through the mesh. One closed end opens to a fluid withdrawal conduit, which is connected to an outlet such as a pump inlet or a siphon. An inner, substantially conical withdrawal manifold is provided with the base of the substantially conical withdrawal manifold connected to the withdrawal conduit and the manifold extending substantially the axial length of the cylindrical mesh. The preferred embodiment of the substantially conical withdrawal manifold is a right cylindrical cone of constant pitch. This right circular cone extends the full length of the barrel type fish and/or particulate screen from the withdrawal conduit at the base of the cone. The conical withdrawal manifold is typically truncated at its end and supported at the closed circular end of the mesh cylinder opposite from the withdrawal conduit. To provide for optimum constant flow through the metal mesh, the generally conical manifold can be formed of a series of connected and truncated cones with increasing conical pitch away from the withdrawal conduit. In the ultimate progression, these connected and truncated cones if continuously and asymptotically combined will result in a paraboloid edge to what is otherwise a substantially conical structure. In all cases, the substantially conical withdrawal manifold defines uniformly sized and arrayed flow apertures. These flow apertures have the same unit area per unit length of the substantially conical withdrawal conduit. This same unit area per unit length produces within the withdrawal manifold, a substantially constant velocity or velocity head distribution at all cross-sections of the manifold taken normal the flow along the major axis of the conical shape. Flow velocity head through the mesh is maintained uniformly distributed at all changes of flow rate through the barrel screen device.

DESCRIPTION OF THE SPECIFIC EMBODIMENTS

Figure 1:
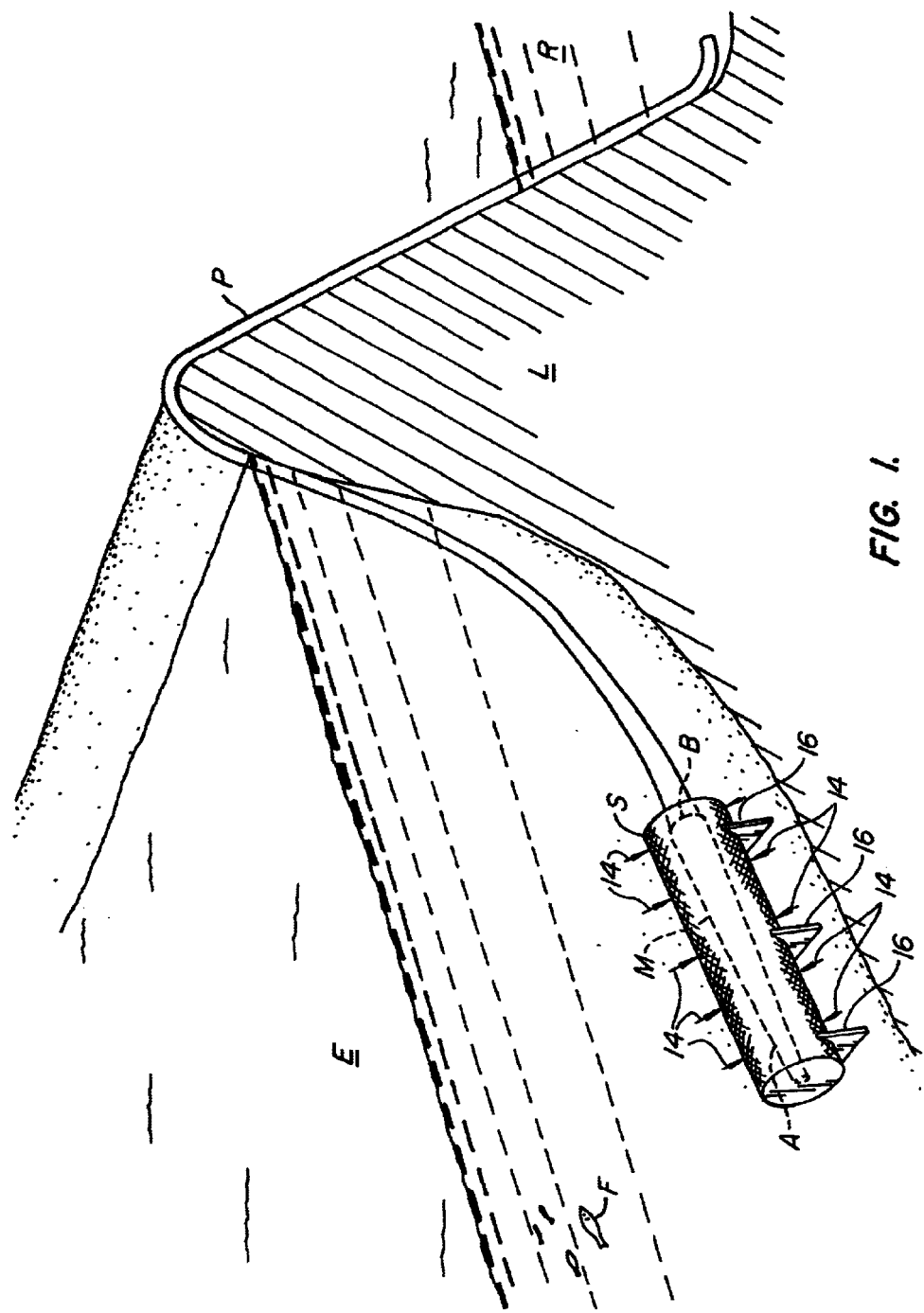
FIG. 1 is a perspective view of the barrel type fish and/or particulate screen of this invention in a water body, such as an estuary or river connected to the suction side of a siphon extending to a reservoir for impounding water.

Referring to FIG. 1, an inlet pipe such as siphon pipe P passes over or through a barrier such as levee L between a water body such as freshwater estuary E and a destination such as collection reservoir R. In estuary E, there is mounted barrel type fish and/or particulate screen S, which barrel type fish and/or particulate screen S is maintained above the true bottom of estuary E. Such mounting is shown here schematically by stands 16. It will be understood that mounting of the screens will be site specific.

We are using the example of the estuary and the reservoir. The reader will understand that this screen will be operable in many differing environments including pumping stations and the like.

Figure 2:
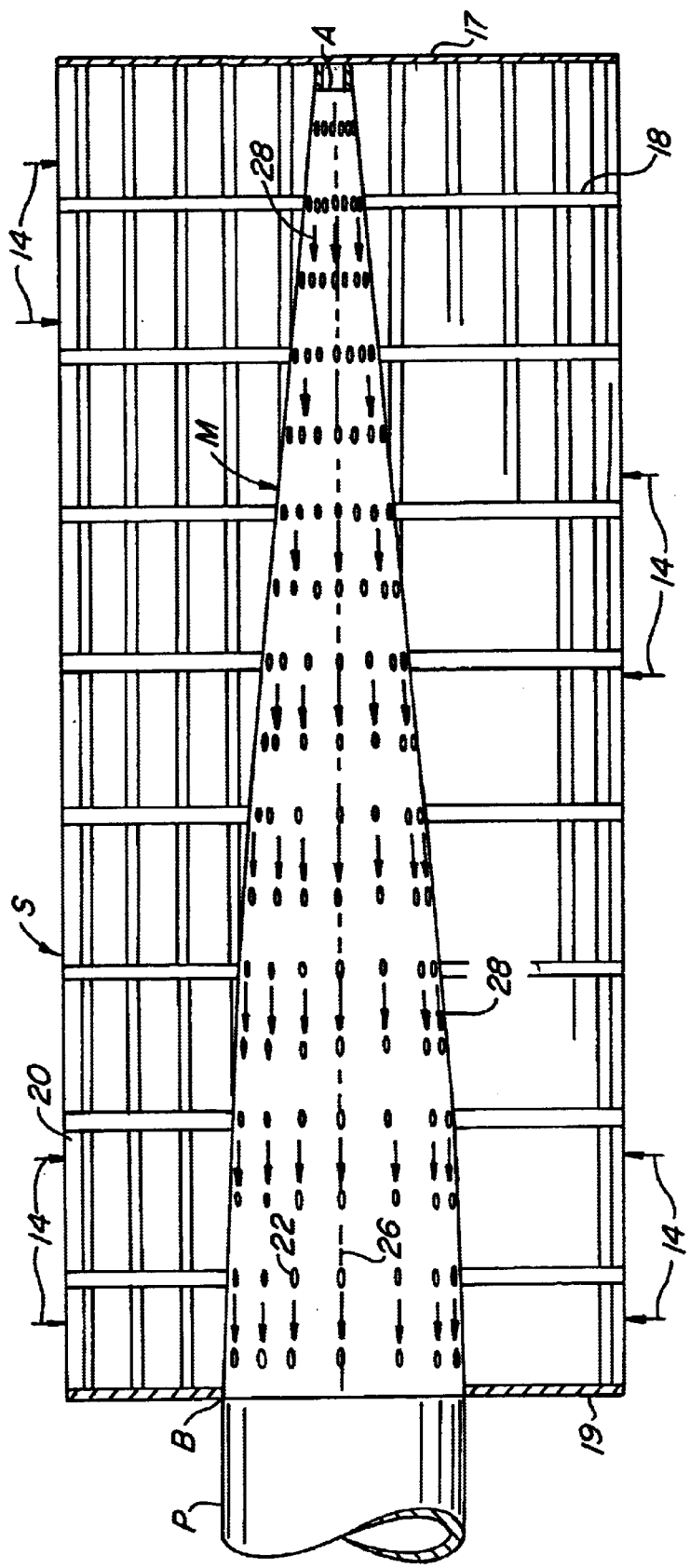
FIG. 2 is side elevation cross-section of the substantially conical withdrawal manifold in the form of a right circular cone illustrating uniform circular apertures per unit length along the cone with the cone being placed concentrically of a cylindrical arrayed mesh.

The screen S typically includes a cylindrical framework 18 covered with a mesh 20 (see FIG. 2). Interior of the screen S, there is a substantially conical collection manifold M. This substantially conical collection manifold includes an apex A (typically truncated) and a base B. The base B generally connects to siphon pipe P.

For the edification of the reader, some exemplary dimensions can be given. For example, the barrel type screen can be seven feet in diameter and thirty feet long. Pipe P at the point of passing through one closed end of the cylinder can be five feet in diameter. There after, the diameter of the pipe may be reduced. Typically, the base of manifold M will start at a diameter of five feet through the closed end 19 and neck down to a truncated apex having a dimension of 4 to 5 inches adjacent end 17.

Mounting of the screen S will be site specific. We show exemplary mountings 16. Some general parameters can be given for such mountings. For example, the screen is not placed on the bottom. Specifically, it is separated from the bottom by about one half a screen diameter or in this case about three and one half (3½) feet. Likewise, the screen is not at the surface. It is below the surface by about one half a screen diameter or in this case about three and one half (3½) feet. What is desired is that a substantially constantly distributed flow path into and through the screen be achieved without either surface or bottom effects.

The type of mounting will site specific and vary from site to site. For example, a cantilever mount may be beneficial. Alternately, suspension from a float may occur.

In the specification that follows, an example of change of flow rate due to variable velocity (or velocity head) will be discussed. This is not to be confused with head differential alone. The reader will appreciate that any number of factors, in addition to changes in head, can result in variable flow rate.

In the following example, a conical collection manifold M is utilized (usually truncated at the apex A). The critical thing that we produce is a uniform flow velocity along the centerline of the conical collection manifold M. This uniform flow velocity coupled with the uniform open area per unit length of the header, creates the uniformity of flow rate entering the manifold along its length. This in turn translates to a uniform flow through screen S. The reader will understand that these uniform velocities can change in absolute values, but will not change when compared one to another at any particular flow rate through the disclosed barrel screen type device.

We prefer screen S to be perforate sheet metal. In this way it can act as a stress skin in tension and/or compression, depending upon the loading.

In the example that follows, we are interested in preserving fish. It will be understood that the illustrated screen is just as effective with particulate.

Operation of the siphon pipe P is conventional and well understood. Specifically, water from estuary E will pass through screen S and into collection manifold M. Thereafter, water from the manifold M will pass through pipe P to the reservoir R. Since, as a practical matter, estuary E has an infinite supply of water and reservoir R has a limited supply of water, reservoir R will gradually equilibrate in level with estuary E. Thus, as the reservoir R fills, the head differential between the two will gradually equilibrate.

Understanding the gradual equilibration between the estuary E and the reservoir R, the need to protect fish F can be explained. Typically, and as previously set forth in this application, certain types of fish require minimum screen velocity for the protection of the juvenile species. The mesh of the screen utilized must be of a sufficiently small dimension so that the juvenile fish cannot pass through the screen S and into the siphon P.

At the same time, it will also be understood that the head driving the siphon P will gradually change. When reservoir R is empty (a head which may be as high as 25 feet) to when the level of risk to reservoir R equilibrates to the level of estuary E, considerable variation in flow rate and velocity head can occur. Thus, the problem with environment in which this invention relies is adequately set forth.

Looking at FIG. 1, velocity vectors 14 can be seen at the exterior of screen S. Two constraints are placed on velocity vectors 14.

First, the velocity vectors 14 can at no time exceed the maximum velocity tolerated by the juvenile species of fish F. Thus, when the maximum head is realized between estuary E and reservoir R, velocity vectors 14 must be constrained through the mesh 20 of screen S to a value below the maximum specified for the fish. Secondly, as the flow rate between estuary E and reservoir R varies, the velocity at any mesh location will vary. However, the velocity vectors 14 will remain equal with one another. Any change in the velocity vectors will be uniform across the screen S.

Having set forth the general environment in which the barrel type fish and/or particulate screen of this invention resides, attention will now be drawn to FIG. 2. With respect to this figure, construction and operation of the invention will be set forth.

FIG. 2 illustrates cylindrical frame 18 extending between closed circular end 17 at one end of the cylindrical framework and closed discharge end 19. Siphon pipe P passes through closed discharge end 19 and connects at base B to collection manifold M. The base B of the right circular cone shown in FIG. 2 tapers to an apex A, the apex A here also being closed. For support purposes, apex A is fastened to closed end 17 of the barrel type screen. Typically, screen S includes mesh 20 arrayed around the circular framework 18.

Substantially conical manifold M is provided with a plurality of apertures 22. These apertures 22 have two specific characteristics.

First, the apertures 22 have the same area per unit length of the substantially conical manifold M. Thus, the area for the first one foot of this substantially conical manifold M adjacent the apex A will be the same as the area of the apertures 22 for the last one foot adjacent the base B.

Secondly, the apertures will all be uniform. Here, the apertures are shown as circular apertures drilled through the metal. It will be understood that the apertures can vary from the circular configuration shown as long as the variation is uniform along the length of the substantially conical manifold M. For example, all apertures could be elliptical.

As will hereinafter be identified, and as far as fluids are concerned, the right circular cone of manifold M shown in FIG. 2 is a compromise. However, for ease of manufacture, this right circular cone M is preferred.

Operation of the device under varying velocity heads and flow rates can now be discussed.

Right circular cone of manifold M is configured about a central axis 26. It tapers in circular cross sections from a large circular cross section head base B to a small circular cross section at base A. Since the apertures 22 are all of the same configuration and have the same area per unit length of the substantially conical manifold M, it will be understood that the velocity through the apertures 22 will remain the same for all of the respective apertures 22. Naturally, as the head increases, the velocity at each aperture A will likewise increase, but that increase will be the same for all apertures 22 from the apex A to the base B.

An important aspect of this invention is the velocity of the water within the substantially conical manifold M remaining constant along its length. Simply stated, the velocity vectors 28 taken in the direction of axis 26 of the right circular cone of manifold M are always constant for the length of the manifold. They are the same adjacent apex A as they are adjacent base B. It is this characteristic that uniformly distributes the screen velocity vectors 14 through the manifold M and the screen S.

It will be appreciated that the substantially conical collection manifold M will admit of variation.

Figure 3:
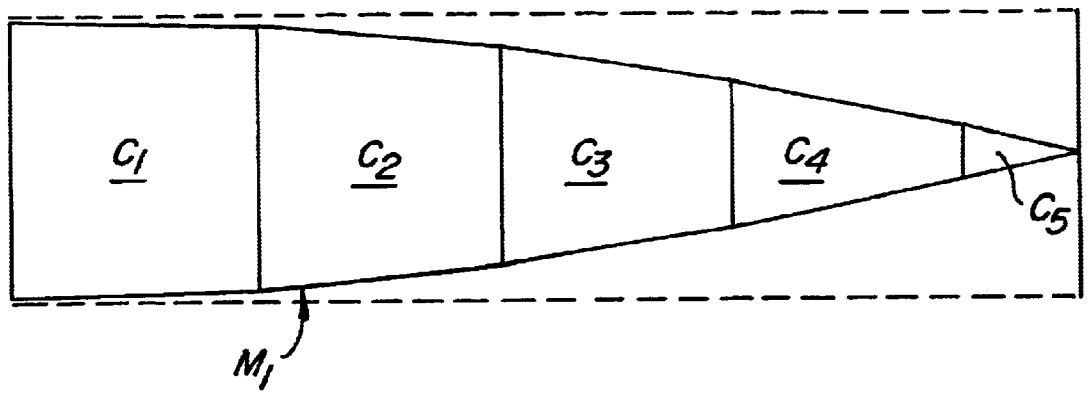
FIG. 3 is a side elevation cross-section of the substantially conical withdrawal manifold including a series of truncated cones of increasing pitch from the base end to the apex end of the manifold.

Turning attention to FIG. 3, manifold M1 is made from a series of truncated cones C1–C5 welded one to another. Each successive truncated cone includes increasing pitch. That is to say the conical slope of cone C1 is gradual whereas the conical slope of cone C5 is relatively steep. When such a manifold has apertures, a slightly more even velocity flow can occur within manifold M. This construction is obviously much more difficult than the right circular cone illustrated in FIG. 2. Accordingly, it is not preferred.

Figure 4:
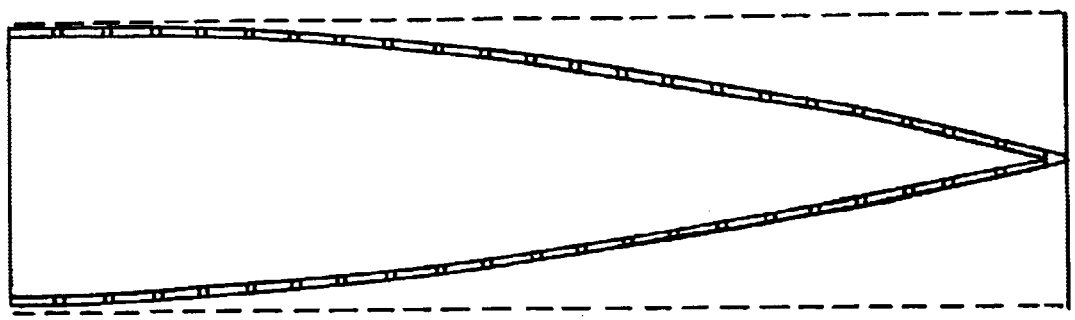
FIG. 4 is a side elevation cross-section of the substantially conical withdrawal manifold including a paraboloid shaped edge; and, FIG. 5 is a perspective view of an embodiment of this design where the screen is within a square sectioned frame work and the substantially conical header constitutes rectilinear tapering sides with a shape roughly approximating a cone.

FIG. 4 represents the ultimate case of the design of FIG. 3. In FIG. 4, the collection manifold M2 constitutes a paraboloid by appropriate placement of the focus and directrix of the paraboloid, the substantially conical format of the manifold M2 illustrated in FIG. 4 can be generated. It is to be noted that FIG. 4 can be also described as including an essentially infinite number of cones C1–C5 to form the profiles that are illustrated. Again, because of the complication of construction, this embodiment is not preferred.

Figure 5:
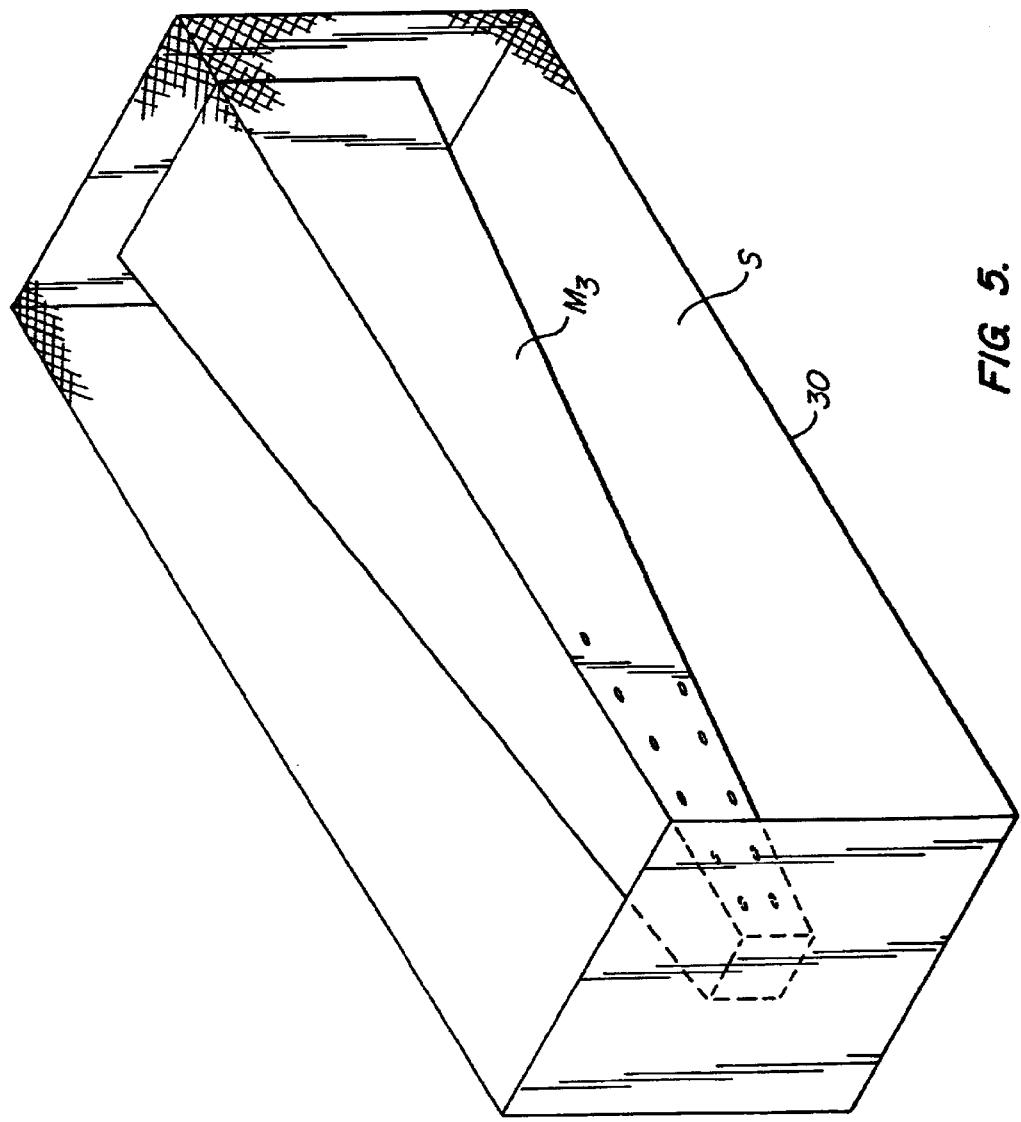

It will be understood that this invention will admit of further modification. For example, the screen could be square in cross-section and the manifold a pyramidal in shape. For the purposes of this application, this will be understood to be "substantially conical" and "substantially cylindrical." Again, these constructions are not preferred because not only is fabrication difficult but additionally the structure includes inherent strength difficulties. Attention is directed to FIG. 5 for this last exemplary embodiment.

In FIG. 5, screen S is shown in a rectilinear support structure 30. The sides of the screen S are all rectilinear.

The substantially conical manifold M3 comprises a truncated four-sided pyramidal structure. Again, the structure is provided with apertures 22 having the same total area per unit length of the substantially conical collection manifold M3. Although the embodiment of FIG. 5 is not preferred, it can be understood that it operates according to the general principles of this invention.

It will be understood that a plurality of such collection headers could be utilized. Again, the velocity within the headers from their apex to the base would have to be constant. Likewise, the velocity between the respective headers would have to be maintained uniform at corresponding placements along their lengths.

What is claimed is:

1. A barrel type fish and/or particulate screen-connected to an outlet for confining fish and/or particulate exterior of the fish and/or particulate screen and collecting water to the interior of the screen, the barrel type fish and/or particulate screen comprising in combination:

an elongate enclosure having mesh sides defining a closed interior for the collection of water and a mesh exterior for preventing fish and/or particulate penetration into the closed interior with the collected water, the elongate enclosure having mesh sides having an outlet end for discharging water passing through the mesh from the exterior of the elongate enclosure to the interior of the elongate enclosure;

a substantially conical withdrawal manifold within the elongate enclosure having mesh sides, the substantially conical withdrawal manifold having a base end and an apex end, the base end connected to the outlet and the substantially conical withdrawal manifold extending substantially the length of the elongate enclosure having mesh sides at the apex end; and, the substantially conical withdrawal manifold having uniformly sized, shaped and arrayed flow apertures, these flow apertures having substantially constant unit area per unit length of the withdrawal conduit to produce a substantially uniform flow velocity across all sections of the substantially conical withdrawal manifold whereby flow velocity through the mesh is maintained substantially uniform at all changes of flow rate through the mesh of the elongate enclosure.

2. The barrel type fish and/or particulate screen of claim 1 and wherein:

the apex end is supported from a closed end of the elongate enclosure.

3. The barrel type fish and/or particulate screen of claim 1 and wherein:

the mesh is metal mesh.

4. The barrel type fish and/or particulate screen of claim 1 and wherein:

the substantially conical withdrawal manifold is concentric to the elongate enclosure having mesh sides.

5. The barrel type fish and/or particulate screen of claim 1 and wherein:

the substantially conical withdrawal manifold comprises a series of truncated cones having increasing pitch from the base to the apex.

6. The barrel type fish and/or particulate screen of claim 1 and wherein:

the substantially conical withdrawal manifold comprises a paraboloid.

7. The barrel type fish and/or particulate screen of claim 1 and wherein:

the elongate enclosure having mesh sides is a cylindrical mesh defining a closed interior for the collection of water and closed at one end with a circular area without mesh and opening at the opposite end to the discharge.

8. The barrel type fish and/or particulate screen of claim 7 and wherein:

the cylindrical mesh defining a closed interior for the collection of water includes an cylindrical shape having mesh stretched over the surface of the cylindrical shape.

9. The barrel type fish and/or particulate screen of claim 1 and wherein:

the uniformly sized, shaped and arrayed flow apertures through the substantially conical withdrawal manifold are circular.

10. In the combination of a barrel type fish and/or particulate screen connected to an outlet for confining fish and/or particulate exterior of the fish and/or particulate screen and collecting water to the interior of the screen, the barrel type fish and/or particulate screen including:

a cylindrical mesh defining a closed interior for the collection of water and a mesh exterior for preventing fish and/or particulate penetration into the closed interior with the collected water, the cylindrical mesh having an outlet end for discharging water and a closed opposite end;

an outlet for receiving water passing through the mesh from the interior of the cylindrical shell;

the improvement in the barrel type fish and/or particulate screen connected to an outlet comprising:

a substantially conical withdrawal manifold within the mesh of the cylindrical shell having a base end and an apex end, the base end connected to the outlet and the substantially conical withdrawal manifold extending substantially the length of the cylindrical shell to the apex end; and, the substantially conical withdrawal manifold having uniformly sized, shaped and arrayed flow apertures, these flow apertures having substantially constant unit area per unit length of the withdrawal conduit to produce a substantially uniform flow velocity across all sections of the substantially conical withdrawal manifold whereby flow velocity through the mesh is maintained uniform at all changes of flow rate through the fish and/or particulate screen.

* * * * *